(12) United States Patent
Jann et al.

(10) Patent No.: US 7,490,206 B2
(45) Date of Patent: Feb. 10, 2009

(54) METHOD AND STRUCTURE FOR LOW MEMORY RELOCATION FOR DYNAMIC MEMORY RECONFIGURATION

(75) Inventors: Joefon Jann, Ossining, NY (US); Ramanjaneya Sarma Burugula, Croton on Hudson, NY (US); Pratap C. Pattnaik, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1248 days.

(21) Appl. No.: 10/097,503

(22) Filed: Mar. 15, 2002

(65) Prior Publication Data

US 2003/0177325 A1   Sep. 18, 2003

(51) Int. Cl.
 *G06F 12/02*   (2006.01)
(52) U.S. Cl. .................. 711/165; 711/170; 711/173

(58) Field of Classification Search ............... 711/165, 711/162, 202; 707/204
See application file for complete search history.

(56) References Cited

U.S. PATENT DOCUMENTS 6,671,786 B2 * 12/2003 Wang et al. ................. 711/162

* cited by examiner

*Primary Examiner*—B. James Peikari
(74) *Attorney, Agent, or Firm*—Douglas W. Cameron, Esq.; McGinn IP Law Group, PLLC

(57) ABSTRACT

A method (and structure) for relocating low memory for an operating system instance in a computer system includes establishing a low memory table (LMT), the LMT comprising information allocated for each of a predefined increment of the low memory to be relocated, setting the information to a first predetermined value, and copying a contents of each of the increments to a new location in a first copy operation.

27 Claims, 4 Drawing Sheets

METHOD AND STRUCTURE FOR LOW MEMORY RELOCATION FOR DYNAMIC MEMORY RECONFIGURATION

BACKGROUND OF THE INVENTION

1. Field of the Invention

The present invention generally relates to minimizing system freeze time during low memory relocation in a shared memory computer system. Specifically, a Low Memory Table keeps track of which memory pages are modified during a first copying phase prior to a system freeze, and during the system freeze only those modified pages are copied in a second copying phase.

2. Description of the Related Art

As shared memory computer systems become larger and larger, the scalability of the operating systems often lags behind. In order to make optimal use of these hardware systems for diverse workloads with varied resource requirements and protection domain requirements, logical partitioning, in which an instance of the operating system runs on only a portion of the physical resources of the system, becomes increasingly prevalent and desirable. FIG. 1 illustrates logical partitioning in a Symmetric Multi Processor (SMP) system 10 and a Non Uniform Memory Architecture (NUMA) system 20. The term "logical partitioning" means that the system is partitioned at logical boundaries instead of physical boundaries. Because the partitioning is done at logical boundaries, the configuration of each partition can be specified at a much finer granularity. For example, which partition each CPU belongs to can be specified, instead of which partition an entire set of CPUs on a single circuit board belongs to. Some situations where logical partitioning can be useful are:

1. An organization running a web hosting business can buy a single SMP or NUMA system, and logically partition it into several partitions, each partition hosting the web site of a different customer. The whole system can later be reconfigured into a different number of partitions depending on the number of customers it needs to serve.

2. An organization can use a simple SMP or NUMA system for development, testing, and production purposes by partitioning it into three partitions. The partitions can later be reconfigured with different sets of resources according to needs. However, the affected partitions have to be rebooted for the new configuration to take effect.

The workloads in the logical partitions often vary with time. So, it is very desirable to be able to move resources such as processors and memory from one logical partition to another without the need of a system reboot of any of the logical partitions involved. The capability to dynamically move memory among logical partitions requires the existence of methods and apparatus to relocate memory. The same methods and apparatus can also be used for concurrent hardware upgrade and maintenance.

Often times an operating system (OS), by its design, accesses certain sections of the system memory in address-translation-off mode. These memory sections are used, among other things, for processor interrupt management routines and related data structures. These memory sections are sometimes referred to as low memory or low core, and are often located in a contiguous range of physical memory addresses. The start and end of this address range are often identified by a pair of hardware registers inside each processor, which are referred to as low memory registers (LMR), as can be seen as items 17-x and 18-x of FIG. 2.

The relocation or migration of the low memory requires that all memory accesses to the low memory be blocked. Due to the nature of the data structures/functions residing in the low memory, blocking all accesses to it essentially boils down to freezing all the activities of the operating system. The process of low memory migration is explained in more detail shortly. Briefly, it involves the following steps, as discussed in more detail for the flowchart shown in FIG. 4:

1. Select a range of contiguous memory region to which the contents of the existing low memory will be migrated.

2. Quiesce the activities of the operating system (OS), also referred to as the start system freeze.

3. Copy the contents of all the low memory page frames to the target region.

4. Update the low memory registers of all the processors in the logical partition to point to the target region.

5. Resume the activities of the OS (also referred to as release the system freeze), so that the OS starts using the new memory region instead of the old one. The copying step (step 3 above) of low memory can often take some time, and since the OS cannot perform any useful services during this period, it is very important to keep this system freeze time to a minimum.

In view of the foregoing, there is currently a need for a way to reduce system freeze time during low memory relocation. Presently, no system is known that attempts to reduce system freeze time to a minimum.

SUMMARY OF THE INVENTION

In view of the foregoing problems, drawbacks, and disadvantages of the conventional systems, it is an object of the present invention to provide a method and structure in which system freeze time is minimized by reducing the number of memory pages required to be copied during the freeze period itself.

Another object of the present invention is to thereby provide a structure and method to improve the efficiency of resource migration in a large-scale shared memory computer system such as, for example, an SMP system and a NUMA system.

To achieve the above goals and objectives, in a first aspect of the present invention, disclosed is a method and structure of dynamically relocating low memory for an operating system instance in a computer system, including establishing a low memory table (LMT), the LMT including information allocated for each of a predefined increment of the low memory to be relocated, setting each information to a first predetermined value, and copying a contents of each of the increments to a new location in a first copy operation.

In a second aspect, also described is a signal-bearing medium tangibly embodying a program of machine-readable instructions for the above-described method.

In a third aspect, described herein is a method of dynamically relocating low memory for an operating system instance in a computer system, the memory relocation being a copying of contents of a predetermined portion of the low memory from a first memory location to a second memory location, including copying a contents of the low memory in a first copying operation, initiating a system-freeze at a completion of the first copying operation, copying during the system-freeze in a second copying operation, the contents of the low memory that have been modified since the first copying operation, updating a low memory pointer to point to the second memory location, and terminating the system-freeze.

The present invention provides a structure and method to improve the efficiency of resource migration in a large-scale shared memory computer system by teaching a method in which system freeze time is minimized by reducing the number of memory pages required to be copied during the freeze period itself.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
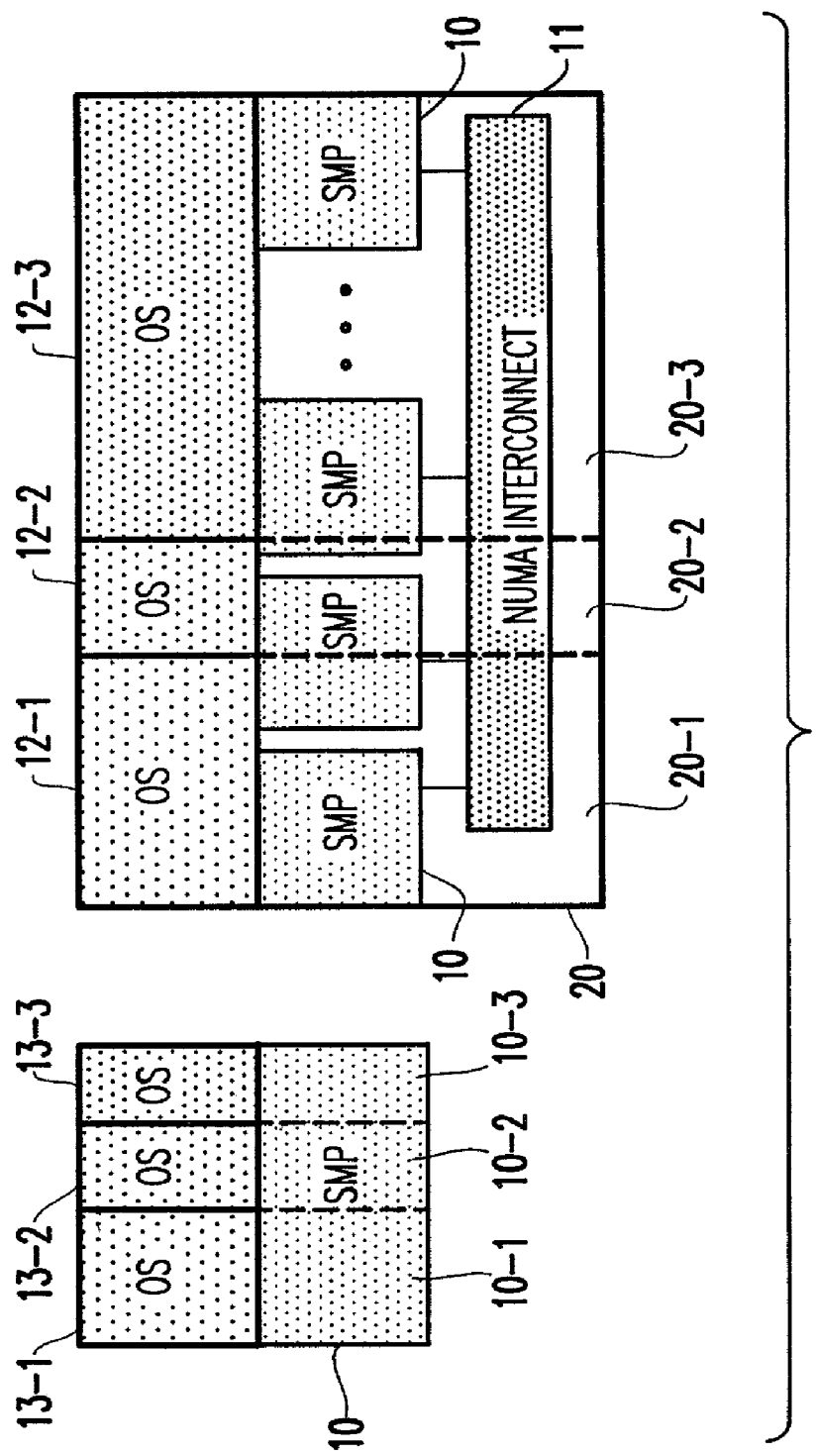
FIG. 1 shows a representation of a typically logically partitioned SMP system and a logically partitioned NUMA system.

Referring now to the drawings, and more particularly to FIG. 1, an exemplary preferred embodiment will now be described. In this figure a typical partitioned Symmetric Multi Processor (SMP) system 10 and a typical partitioned Non Uniform Memory Architecture (NUMA) system 20 are shown. These partitions can be used in the present invention.

A typical SMP system 10 includes, among other things, several Central Processing Units (CPUs), Random Access Memory (RAM) and I/O devices. A typical NUMA system 20 includes several SMP systems 10 connected by a NUMA Interconnect 11. A logically partitioned SMP/NUMA system supports more than one instance of an operating system running simultaneously.

In FIG. 1, the SMP 10 is exemplarily partitioned into three logical partitions 10-1, 10-2, and 10-3. Each logical partition runs its own instance of an operating system. That is, OS 13-1 runs on partition 10-1, OS 13-2 runs on partition 10-2, and OS 13-3 runs on partition 10-3. Similarly, the NUMA system 20 is exemplarily partitioned into three logical partitions 20-1, 20-2, and 20-3 running OS instances 12-1, 12-2, and 12-3, respectively. Each partition is composed of a set of exclusive resources.

Figure 2:
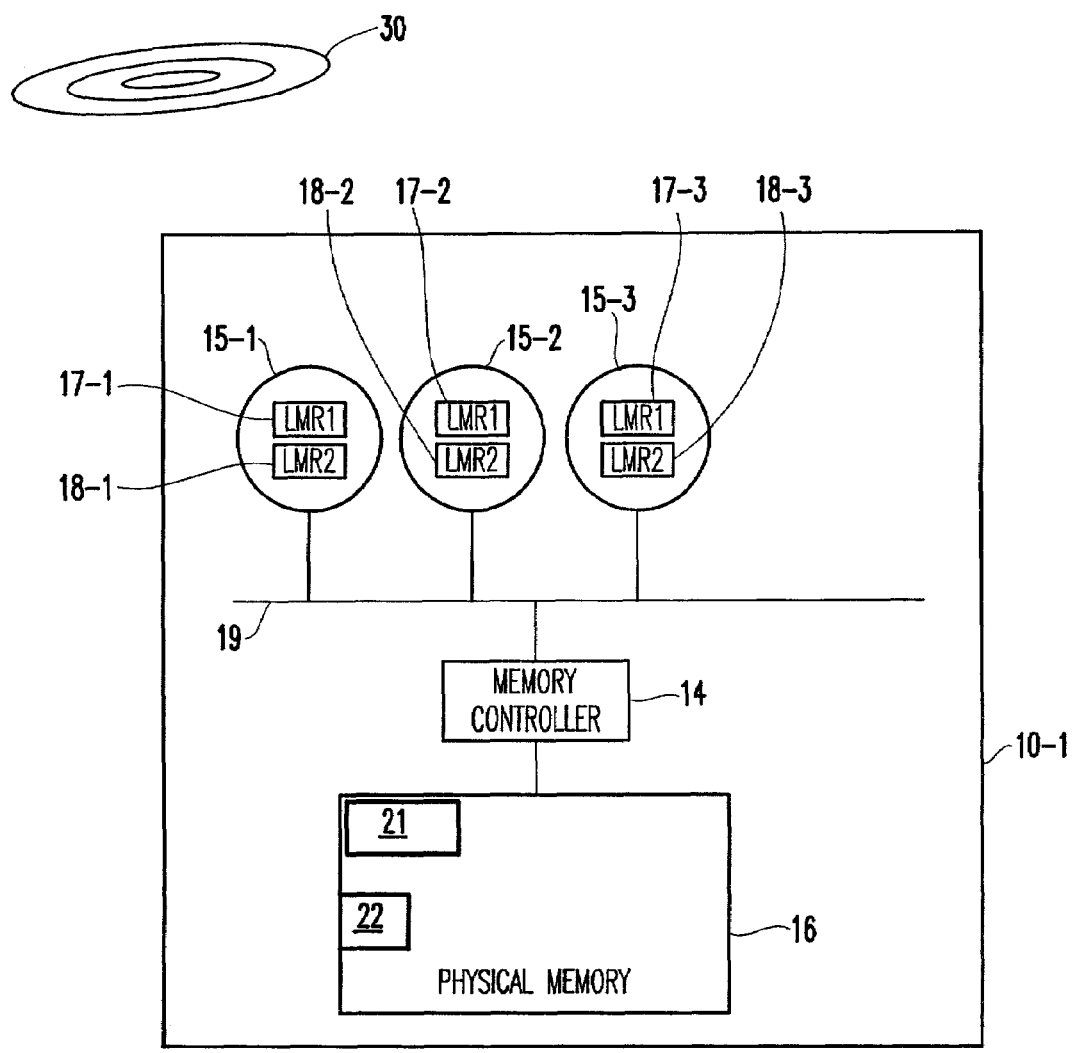
FIG. 2 shows the hardware components of the present invention in a partition.

FIG. 2 shows an SMP partition 10-1 in more detail. Partition 10-1 contains processors 15-1, 15-2, 15-3, some amount of RAM 16 and some I/O devices (not shown). These components are interconnected by the system bus 19. The accesses to the RAM 16 by the processors 15-1, 15-2, 15-3 go through the memory controller 14. Each processor contains two registers, besides several others, that are specifically used to identify the low memory used by the operating system.

In FIG. 2, the register pairs are shown as (17-1, 18-1), (17-2, 18-2), (17-3, 18-3) for the processors 15-1, 15-2, 15-3, respectively. The low memory 21, which the operating system usually accesses in Translation-off mode, is a contiguous chunk within the SMP's RAM 16. Each partition will have its own chunk of low memory that is different from other partition's low memory.

Figure 4:
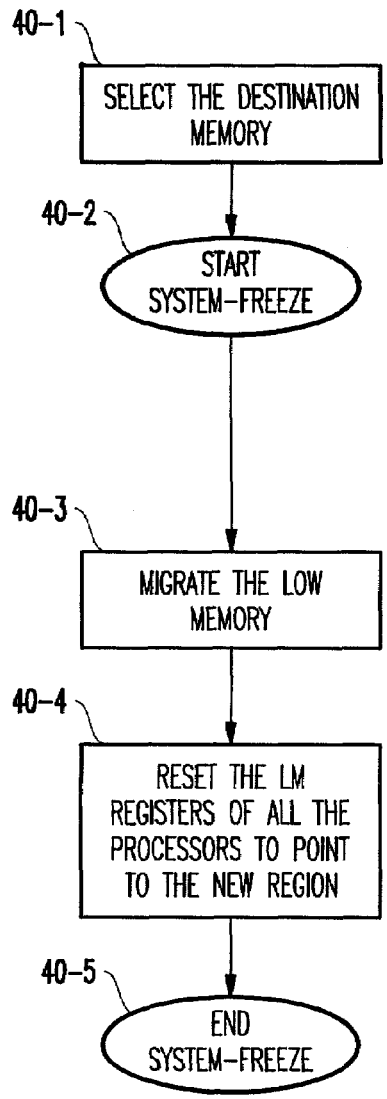
FIG. 4 shows a flowchart of low memory relocation, using a conventional method.

Dynamic Logical Partitioning (DLPAR) is defined as the ability to change the configuration of a partition (number of CPUs, amount of memory, I/O, etc.) without the need to reboot the partition. Adding DLPAR capability to an SMP or a NUMA system requires that the low memory of the operating system be able to migrate from one location to another location in the physical memory space without shutting down the operating system. This can be done as shown in FIG. 4, the steps of which are summarized below.

Step 40-1) Select a contiguous chunk of physical memory as the destination memory to migrate the contents of low memory.

Step 40-2) Quiesce the activities of the OS (also referred to as System Freeze). This is done by a series of steps which ultimately result in no regular OS activity taking place. That is, no interrupt occurs and no context switch occurs. All the threads that are being executed are those specially created for the purpose of low memory migration. All the CPUs run in Translation-Off mode, and except for the one that is running the low memory migration code, all other CPUs wait in a loop until the low memory migration is completed.

That is, all the CPUs (except the one actually running the low memory migration code) managed by this OS are run in Translation-Off mode with external and decrementer interrupts disabled. The code is carefully written so as not to generate any interrupts such as program interrupts or alignment interrupts.

Step 40-3) Migrate the low memory. This involves copying the contents of low memory from the old location to the new location. Typically, the copying is executed in increments of a memory page.

Step 40-4) Reset the low memory registers (LMRs) of all the processors to point to the new location of the low memory.

Step 40-5) Release the operating system from the system freeze condition. This is basically undoing step 40-2. All the threads created to perform low memory migration are terminated, and interrupts are re-enabled.

It can be seen from the above procedure that, to reduce the impact to other operating system components, it is essential to keep the system freeze duration as short as possible.

The present invention uses a new way to relocate the low memory that will substantially reduce the duration of system freeze. In essence, the present invention copies the low memory contents to be relocated a first time prior to the system freeze. During the freeze period itself, the only pages required to be copied a second time are those pages that were modified since the first copying. In order to track which pages were modified, the present invention sets up a Low Memory Table (LMT) that tracks which pages were modified since the first copying. Since very few pages will have to be re-copied, the system freeze time is greatly reduced from that of the conventional method.

Figure 3:
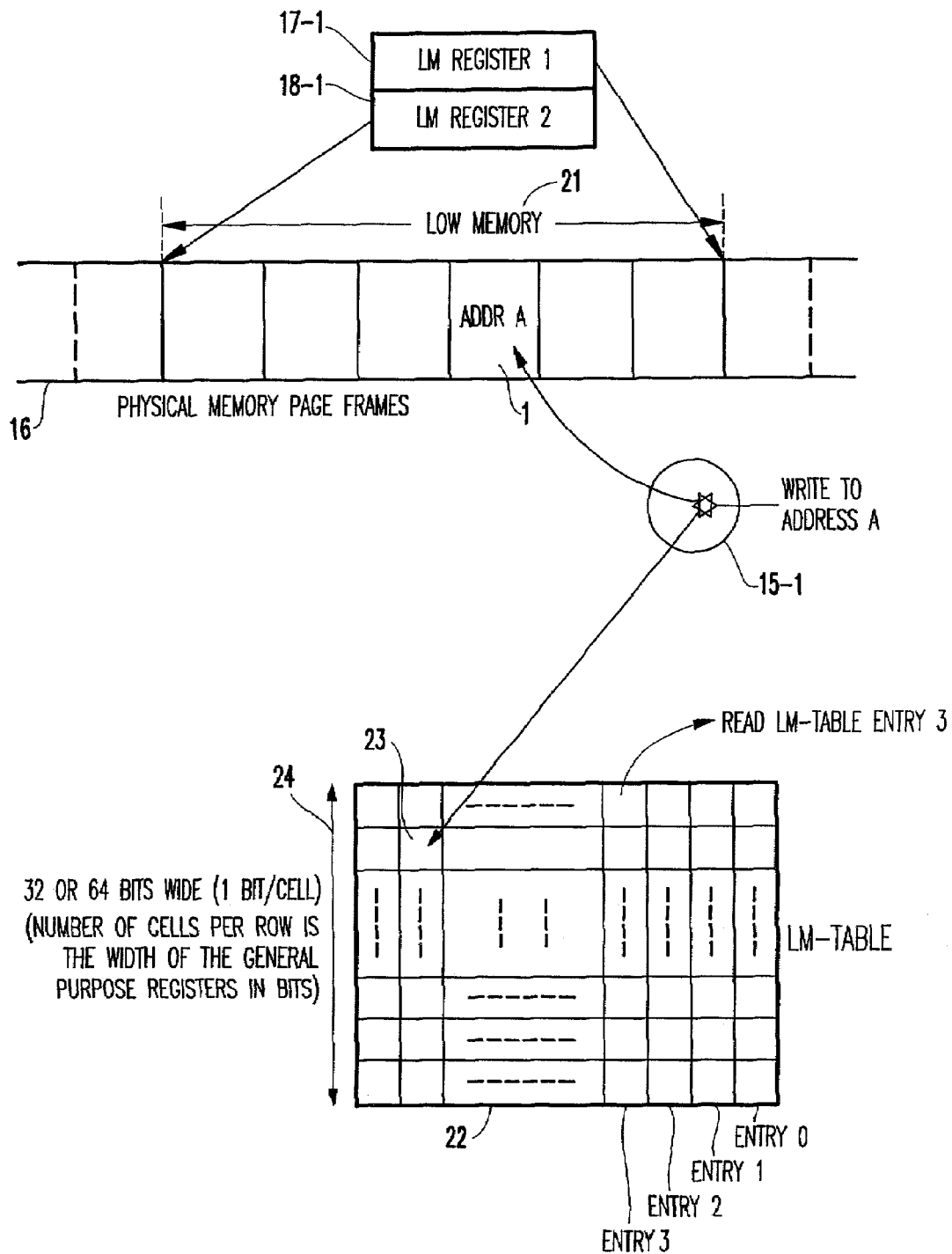
FIG. 3 shows how various components of the present invention are used.

An exemplary embodiment of the apparatus of the present invention is shown in FIGS. 2 and 3. A small amount of RAM is allocated to be used for the Low Memory Table (LMT) 22. The LMT 22 may contain several entries, the size 24 of each entry being either 32 or 64 bits, depending on the width of the architecture of the general purpose registers in the system. Conceptually, the LMT preferably is a bit map of the low memory, where each page in the low memory is preferably represented by a unique bit in the LMT. Thus, the size of the LMT is directly proportional to the amount of low memory. There is one LMT for each operating system instance. Under normal conditions, i.e., when there is no process of migrating the low memory, this LMT will not be touched.

Figure 5:
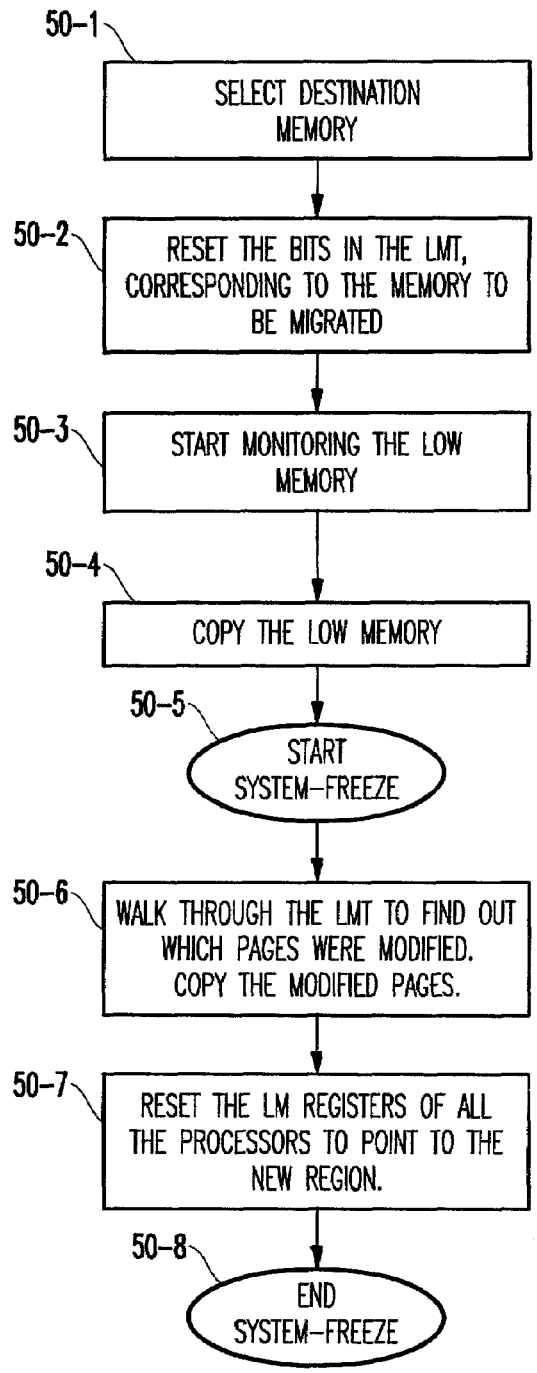
FIG. 5 shows a flowchart of low memory relocation, using an exemplary preferred embodiment of the present invention.

FIG. 5 shows how the low memory can be efficiently migrated using the LMT mechanism of the present invention.

Step 50-1) Select a contiguous chunk of physical memory as the destination memory to migrate the low memory.

Step 50-2) For each of the low memory page frames of the source memory region, set the bit to zero in the LMT corresponding to it.

Step 50-3) Start monitoring the low memory so that all the write operations to the low memory are recorded in the LMT. The monitoring mechanism works as follows: For all the CPUs in the current operating system instance, a bit in the Machine State Register (MSR) is turned on, indicating that low memory writes should be monitored. The CPUs themselves identify the low memory with the register 17-x and 18-x. The LMT can be identified either with a special purpose register, or at an offset from the starting address of the low memory. Once the bit in the CPU's MSR is set, whenever there is a write operation to a page in the low memory, the CPU sets the bit in LMT corresponding to that page to "1".

That is, referring to FIG. 3, if the OS executing on CPU 15-1 issues a store instruction to address A, and if A is in low memory as specified by the low memory registers 17-1 and 18-1, then the CPU automatically issues another store instruction to atomically set bit 23, the bit in LMT 22 corresponding to the page containing address A.

From this step on, if any CPU tries to modify any page in the low memory specified by the two LM registers, the corresponding bit in the LMT will be set to "1". It should be noted that the LMT bits can be set to "0" by any of the processors and is set to "1" by, for example, the memory controller 14 whenever any content of the low core page is updated.

The bits of the LMT of the present invention are different from the bits often present in the Translation Lookaside Buffer (TLB) kept inside each respective processor 15-1, 15-2, 15-3. The TLB bits are modified only for updating access through a virtual memory system. The bits of the present invention are changed to "1" whenever any part of the page frame is updated, independent of the mode of the access and of the accessing agent. For example, the respective bit would be set to "1" if this page frame is updated in address-translation-off mode or, for example, by direct memory access (DMA) adapters, I/O controllers, or NUMA controllers.

Step 50-4) Copy the contents of all the page frames from the source region to the target region. At this point, system freeze condition is not yet acquired. All the activities of the operating system are performed as usual. This step provides a first relocated copy of all low memory to be relocated.

Step 50-5) Quiesce the activities of the OS (also referred to as start the system freeze).

Step 50-6) For each page frame in the source region, check the corresponding bit in the LMT to see if it was set to one (i.e., if content was modified). If the LMT bit indicates the page was modified, the page is copied a second time.

Step 50-7) Update the low memory registers of all the processors in the logical partition to point to the new memory region.

Step 50-8) Release the system freeze, so that the OS starts using the new memory region instead of the old one.

These steps, even without detailed knowledge of the operating system's low memory access paths, avoid the need of a system freeze during the copying of the read-only parts of the low memory as well as those parts that were not modified during the period of the first copying of the region (i.e., step 50-4 above). Hence, this procedure keeps the system freeze time to a minimum, thus improving the efficiency of resource migration. Typically, the amount of time saved would be of the order of a few seconds.

Although the exemplary embodiment of the present invention as discussed above indicated that the LMT is stored in RAM, that the increment of memory involved a page, and that the LMT bit values are set to zero for the memory migration process. These details were intended as examples only, and it should be obvious to one of ordinary skill in the art that such details are easily variable. These exemplary details are not intended as the only embodiments of the present invention. For example, the LMT could be incorporated in the memory controller 14 rather than RAM 16 or possibly in a register temporarily designated for this function.

It should also be obvious to one of ordinary skill in the art that the present invention would typically be incorporated as a part of the operating system software of the computer such as 10-1 shown in FIG. 2. Accordingly, in addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU and hardware above, to perform the method of the invention.

This signal-bearing media may include, for example, a RAM 16 contained within the SMP 10-1 as shown in FIG. 2. Alternatively, the instructions may be contained in another signal-bearing media, such as a data storage diskette 30, directly or indirectly accessible by the SMP 10-1, containing the machine-readable instructions for an operating system that includes the present invention as one operating system component.

Whether contained in the diskette 30, the computer/CPU/SMP 10-1, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of dynamically relocating low memory for an operating system instance in a computer system in a manner that reduces a freezing of said operating system instance during said relocating, said low memory comprising interrupt management routines for said operating system instance and related data structures, said method comprising:

establishing a low memory table (LMT), said LMT comprising information allocated for each of a predefined increment of said low memory to be relocated;

setting said information to a first predetermined value; and copying contents of each of said increments to a new location in a first copy operation, wherein said LMT is defined in accordance with low memory registers (LMRs) that define boundaries of said low memory.

2. The method of claim 1, further comprising:
monitoring said low memory at a first location during a copying of contents of a predetermined portion of said low memory from said first memory location to a second memory location to determine whether any of said increments being relocated is modified; and
for any said modified increment, setting said information in said LMT associated with said modified increment to a second predetermined value.

3. The method of claim 2, further comprising:
following a completion of said first copy operation, initiating a system-freeze for said operating system instance;
determining which of said information in said LMT contains said second predetermined value;
copying, in a second copy operation from said first location to said second location, a contents of each of said increments corresponding to said information having said second predetermined value; and
terminating said system-freeze after said second copy operation.

4. The method of claim 3, wherein said first memory location is stored as one or more addresses in one or more low memory location registers in one or more processors executing in said operating system instance, said method further comprising:
prior to said terminating said system-freeze, updating said low memory location registers to contain one or more addresses of said second memory location.

5. The method of claim 4, wherein said predefined increment of said low memory to be relocated comprises a page.

6. The method of claim 2, wherein said information allocated for each of a predefined increment of said low memory comprises a bit and said first predetermined value comprises "0" and said predetermined second value comprises "1".

7. The method of claim 1, wherein said low memory comprises an address-translation-off memory such that said operating system retrieves contents at said low memory without translating an address.

8. The method of claim 1, wherein said computer system comprises a shared memory computer system wherein a plurality of operating systems selectively operate concurrently.

9. The method of claim 8, wherein said shared memory computer system comprises one of a:
symmetric multi processor (SMP) system; and
non uniform memory architecture (NUMA) system.

10. The method of claim 1, further comprising:
providing a bit in a machine state register (MSR) of a central processing unit (CPU) executing said operating system instance, said bit indicating that low memory writes should be monitored.

11. The method of claim 10, further comprising:
once said bit in said CPU MSR is set, setting a bit in the LMT corresponding to a page in said low memory for which a write operation occurs.

12. A computer system for dynamically relocating low memory for an operating system instance in said computer system in a manner that reduces a freezing of said operating system instance during said relocating, said low memory comprising interrupt management routines for said operating system and related data structures, said system comprising:
a table generator to establish a low memory table (LMT), said LMT comprising information allocated for each of a predefined increment of said low memory to be relocated and being defined in accordance with low memory registers (LMRs) that define boundaries of said low memory;
a writer to set each said information to a first predetermined value; and
a copier to copy contents of each of said increments to a new location in a first copy operation.

13. The system of claim 12, further comprising:
a memory monitor for monitoring said low memory at a first location during said copying by said copier of a predetermined portion of said low memory from said first location to a second location, to determine whether any of said increments being relocated is modified; and
an updater for setting said associated LMT information to a second predetermined value for any said modified increment.

14. The system of claim 13, further comprising:
an operation system freeze unit for initiating a system-freeze for said operating system instance following a completion of said first copy operation by said copier;
a comparator for determining which of said information in said LMT contain said second predetermined value,
wherein said copier copies, in a second copy operation from said first location to said second location, a contents of each of said increments corresponding to said information having said second predetermined value and said operation system freeze unit terminates said system-freeze after said second copy operation.

15. The system of claim 14, wherein said first memory location is stored as one or more addresses in one or more low memory location registers in one or more processors executing in said operating system instance, said system further comprising:
an updater for updating said low memory location register to contain an address of said second memory location prior to said terminating said system-freeze.

16. The system of claim 15, wherein said predefined increment of said low memory to be relocated comprises a page.

17. The system of claim 13, wherein said information allocated for each of a predefined increment of said low memory comprises a bit and said first predetermined value comprises "0" and said second predetermined value comprises "1".

18. The system of claim 12, wherein said low memory comprises an address-translation-off memory such that said operating system retrieves a contents at said low memory without translating an address.

19. A signal-bearing storage medium tangibly embodying a program of machine-readable instructions executable by a digital processing apparatus to perform a method of dynamically relocating low memory for an operating system instance in a computer system in a manner that reduces a freezing of said operating system instance during said relocating, said low memory comprising interrupt management routines for said operating system instance and related data structures, said method comprising:
establishing a low memory table (LMT), said LMT comprising information allocated for each of a predefined increment of said low memory to be relocated, said LMT being defined in accordance with low memory registers (LMRs) that define boundaries of said low memory;
setting said information to a first predetermined value; and
copying contents of each of said increments to a new location in a first copy operation.

20. The signal-bearing storage medium of claim 19, said memory relocating comprising a copying of contents of a predetermined portion of said low memory from a first memory location to a second memory location, said method further comprising:

monitoring said low memory at said first location during said copying to determine whether any of said increments being relocated is modified; and for any said modified increment, setting said associated LMT information to a second predetermined value.

21. The signal-bearing storage medium of claim 20, said method further comprising:

following a completion of said first copy operation, initiating a system-freeze for said operating system instance;

determining which of said information in said LMT contain said second predetermined value;

copying, in a second copy operation from said first location to said second location, contents of each of said increments corresponding to said information having said second predetermined value; and terminating said system-freeze after said second copy operation.

22. The signal-bearing storage medium of claim 21, wherein said first memory location is stored as one or more addresses in one or more low memory location registers in one or more processors executing in said operating system instance, said method further comprising:

prior to said terminating said system-freeze, updating said low memory location register to contain an address of said second memory location.

23. The signal-bearing storage medium of claim 22, wherein said predefined increment of said low memory to be relocated comprises a page.

24. The signal-bearing storage medium of claim 21, wherein said information allocated for each of a predefined increment of said low memory comprises a bit and said first predetermined value comprises "0" and said second predetermined value comprises "1".

25. The signal-bearing storage medium of claim 19, wherein said low memory comprises an address-translation-off memory such that said operating system retrieves a contents at said low memory without having to translate an address.

26. A method of dynamically relocating low memory for an operating system instance in a computer system in a manner that reduces a freezing of said operating system instance, said low memory comprising interrupt management routines for said operating system instance and related data structures, said memory relocating comprising a copying of contents of a predetermined portion of said low memory from a first memory location to a second memory location, said method comprising:

establishing a low memory table (LMT), said LMT comprising information allocated for each of a predefined increment of said low memory to be relocated, said LMT being defined in accordance with low memory registers (LMRs) that define boundaries of said low memory;

copying contents of said low memory in a first copying operation from said first memory location to said second memory location;

initiating a system-freeze at a completion of said first copying operation, if contents of said LMT indicates that contents of any of said low memory has been modified since said first copying operation;

copying during said system-freeze, in a second copying operation, contents of said low memory that have been modified since said first copying operation, as identified by said LMT;

updating a low memory pointer to point to said second memory location; and terminating said system-freeze.

27. The method of claim 26, further comprising:

establishing a low memory table (LMT), said LMT comprising information as to whether any memory content of said low memory contents copied in said first copying has changed since being copied in said first copying operation; and using said LMT to determine which memory contents will be copied during said second copying operation.

* * * * *